United States Patent
Mori (10) Patent No.: US 7,118,233 B2
(45) Date of Patent: Oct. 10, 2006

(54) POLYGON MIRROR DRIVE MOTOR

(75) Inventor: Shigeyoshi Mori, Fujieda (JP)

(73) Assignee: Victor Company of Japan, Limited, Kanagawa-ken (JP)

(*) Notice: Subject to any disclaimer, the term of this patent is extended or adjusted under 35 U.S.C. 154(b) by 0 days.

(21) Appl. No.: 11/126,212

(22) Filed: May 11, 2005

(65) Prior Publication Data

US 2006/0039058 A1    Feb. 23, 2006

(30) Foreign Application Priority Data

Aug. 20, 2004  (JP) .................. P2004-240811

(51) Int. Cl.
  *G02B 7/182*  (2006.01)
  *G02B 26/08*  (2006.01)
(52) U.S. Cl. .................. 359/855; 359/216; 359/219
(58) Field of Classification Search .............. None
  See application file for complete search history.

(56) References Cited

U.S. PATENT DOCUMENTS 6,648,482 B1 *  11/2003  Hatakeyama et al. ....... 359/855

FOREIGN PATENT DOCUMENTS

JP    09-043529    2/1997
JP    09-061743    3/1997

* cited by examiner

*Primary Examiner*—James Phan
(74) *Attorney, Agent, or Firm*—Nath & Associates PLLC; Gary M. Nath; Gregory B. Kang (57) ABSTRACT

A polygon mirror drive motor according to the present invention comprises a stator and a rotor having a hexahedron-shaped polygon mirror and a rotation drive shaft. The polygon mirror in one preferred mode is comprised of two square faces that are parallel with each other and orthogonal to said rotation drive shaft, the two square faces having each a center hole in which said rotation drive shaft is inserted, and four mirror facets that are parallel with said rotation drive shaft. In the polygon mirror, a value of D/L is preferably in a range of from 0.37 to 0.41 where D is a diameter of said center hole and L is an edge length of said two square faces.

2 Claims, 7 Drawing Sheets

DISPLACEMENT DIFFERENCE

DISPLACEMENT DIFFERENCE

D/L vs DISPLACEMENT DIFFERENCE
(L=20mm, N=30000RPM)

FIG.6B

N=30000 (RPM)
L=20 (mm)

| D/L | PC (nm) | Al (nm) |
|---|---|---|
| 0.1 | 115.16 | 24.65 |
| 0.2 | 90.26 | 19.32 |
| 0.3 | 49.05 | 10.50 |
| 0.39 | 1.03 | 0.22 |
| 0.4 | 7.20 | 1.54 |
| 0.5 | 77.36 | 16.36 |
| 0.6 | 161.43 | 34.56 |
| 0.7 | 256.96 | 55.01 |
| 0.8 | 313.27 | 67.06 |

FIG.7A DISPLACEMENT DIFFERENCE

FIG.7C DISPLACEMENT DIFFERENCE

D/L vs DISPLACEMENT DIFFERENCE
(L=40mm, N=30000RPM)

FIG.8B

N=30000 (RPM)
L=40 (mm)

| D/L | PC (nm) | Al (nm) |
|---|---|---|
| 0.1 | 886.16 | 189.70 |
| 0.2 | 695.09 | 148.80 |
| 0.3 | 379.10 | 81.15 |
| 0.39 | 4.68 | 1.00 |
| 0.4 | 52.64 | 11.27 |
| 0.5 | 591.75 | 126.68 |
| 0.6 | 1238.50 | 265.12 |
| 0.7 | 1972.80 | 422.32 |
| 0.8 | 2382.70 | 510.06 |

POLYGON MIRROR DRIVE MOTOR

BACKGROUND OF THE INVENTION

1. Field of the Invention

The present invention relates to a polygon mirror drive motor for use in a laser beam printer, a photocopier or the like, and is equipped with a polygon mirror for deflecting and scanning a laser beam.

2. Description of the Related Art

In a laser beam printer or a photocopier is utilized a polygon mirror drive motor. In the polygon mirror drive motor, a polygon mirror configured by combining a plurality of mirror facets into a polygonal shape, seen in plain view, is mounted in a rotor portion that rotates with respect to a stator. With this, the polygon mirror can rotate at high speed to deflect and scan a laser beam being incident upon the plurality of the mirror facets. A scanning light beam produced by deflecting and scanning the laser beam with the polygon mirror creates an image on a photoreceptor or paper.

By the way, since a polygon mirror that is produced with a plurality of mirror facets formed into a shape of a polygon is deformed by a centrifugal force when the polygon mirror rotates at high speed, there exits a light scanning optical device that is capable of correcting the deformation (Refer to Japanese Patent Application Publication H09-43529).

In addition, there is a polygon mirror that realizes a high degree of optical precision in a motor mounting hole, a motor mounting base and the like, while reducing its weight and costs by arranging four mirror facets in square in plain view.

Figure 1:
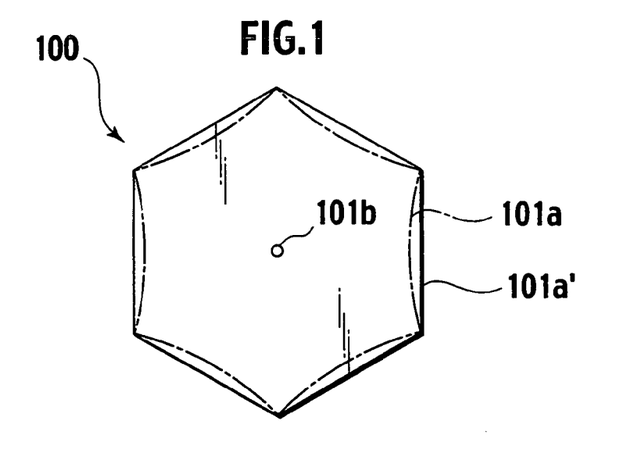
FIG. 1 illustrates a top view of an example of a polygon mirror used in a light scanning optical apparatus of related art.
Figure 2A:
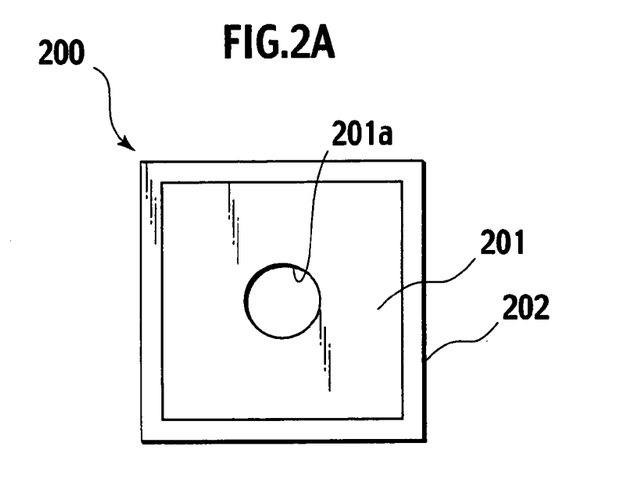
FIGS. 2A and 2B illustrate a top and a cross-sectional view of another example of a polygon mirror of related art, respectively.
Figure 2B:
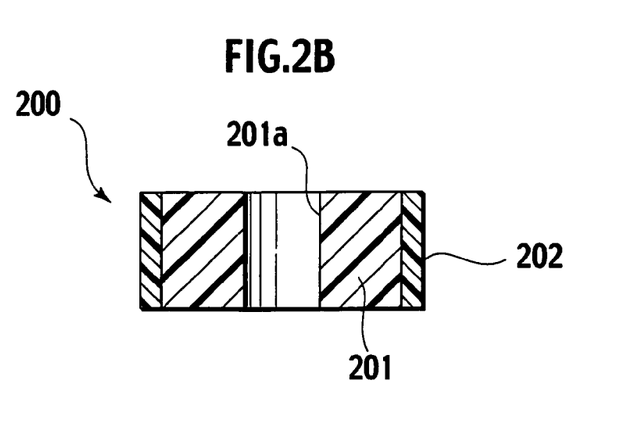

FIG. 1 illustrates a top view of an example of a polygon mirror used in a light scanning optical apparatus of related art. FIGS. 2A and 2B illustrate a top and a cross-sectional view of another example of a polygon mirror of related art, respectively.

The example of a polygon mirror 100 used in the related art light scanning optical apparatus illustrated in FIG. 1 is disclosed in Japanese Patent Application Laid-open Publication H09-43529. The polygon mirror 100 has a deflective reflection surface 101a that has been shaped into a slight concave when the polygon mirror 100 stays stationary, as shown in a dashed line in FIG. 1. When the polygon mirror 100 rotates at high speed around a rotation axis 101b, the deflective reflection surface 101a deforms so as to bulge out to take a shape of a deflective reflection surface 101a' that is shown in a full-line in FIG. 1 due to a centrifugal force caused by high-speed rotation. Therefore, while a focal point of the polygon mirror 100 lies in front of a surface to be scanned when the mirror 100 stays stationary, the focal point falls upon the surface to be scanned when the mirror 100 rotates at high speed, thereby compensating a positional change of the focal point stemming from the deformation caused by the rotation of the polygon mirror 100.

Another example of a rotation polygon mirror is disclosed in Japanese Patent Application Laid-open Publication H09-61743 as shown in FIGS. 2A and 2B. The rotation polygon mirror 200 is shaped into a hexahedron having six square faces of 4 mm thick. The rotation polygon mirror 200 has a center core 201 in the center thereof and an optical face core 202 that surrounds the center core 201. Through the center core 201 is pierced a hole 201a for a motor shaft and formed of polycarbonate containing glass fiber having a rigidity. The optical face core 202 is formed of polycarbonate as thermoplastic material having optical properties suitable for a rotational polygon mirror. With the above configuration, the above publication recites that the mirror 200 can be produced with high positional accuracy in a motor shaft hole, a base level or the like and thereby with high optical accuracy while keeping production costs for the mirror 200 reduced.

In case of the polygon mirror 100 of an example used for the conventional optical scanning optical apparatus shown in FIG. 1, it is necessary to design the deflective reflection surface 101a so that the surface 100a takes a shape of an appropriate concave, taking account of an amount of the deformation caused when the deflective reflection surface 101a is forced to bulge out by the centrifugal force at the time of high-speed rotation. However, it is difficult to estimate in advance an amount of the deformation of the deflective reflection surface 101a, and also difficult to create the deflective reflection surface 101a into a concave in accordance with the estimation. On top of that, considering a technology trend in that a further increase in the rotation speed of the polygon mirror 100 has been expected in view of a recent progress in a laser beam printer or a photocopier in terms of highly definitive and precise imaging, a deformation of deflective reflection surface 101a caused by a centrifugal force has now drawn a great deal of attention, since the centrifugal force at the time of high-speed rotation of the polygon mirror 100 is proportional to the number of rotations to the 2nd power. For this reason, it is still more difficult to estimate the amount of the deformation of the deflective reflection surface 101a.

Moreover, an upper surface, a lower surface, and four mirror facets are easily obtained with high dimensional precision, the four mirror facets being configured to surround the upper and the lower surface and to become a side face of the polygon mirror, since the polygon mirror 200 shown in FIGS. 2A and 2B is formed into a hexahedron. However, since the outside of a main core 201 having a high rigidity is covered with an optical surface core 202 having a favorable optical property, a production of the rotation multifaceted mirror (polygon mirror) 200 needs an increased number of processes, thereby resulting in high production costs.

In view of the above, it has been desired that a polygon mirror drive motor which can control the deformation of each mirror facet caused by the centrifugal force of high-speed rotation is obtained while producing easily a polygon mirror having sufficient dimensional precision by connecting a total of four mirror facets into a square in plain view.

SUMMARY OF THE INVENTION

A first aspect of the present invention provides a polygon mirror drive motor comprising a stator and a rotor having a hexahedron-shaped polygon mirror. The polygon mirror has a circular hole having a center point thereof on a rotation axis of the rotor, two square faces that are parallel with each other and orthogonal to the rotation axis, and four mirror facets that are parallel with the rotation axis. In the polygon mirror drive motor, a value of D/L is in a range of from 0.37 to 0.41 where D is a diameter of the circular hole and L is a distance between two of the four mirror facets, the two mirror facets opposing each other.

A second aspect of the present invention provides a polygon mirror drive motor according to the first aspect, further comprising a rotation drive shaft that is provided on the rotation axis and inserted through the circular hole.

According to a polygon mirror drive motor of the present invention, the hexahedron-shape polygon mirror mounted in a rotor portion which rotates in relation to a stator portion has a circular hole having a center point thereof on a rotation axis of the rotor, two square faces that are parallel with each other and orthogonal to the rotation axis, and four mirror facets that are parallel with the rotation axis. In the polygon mirror, when a diameter of the circular center hole and a distance between opposing two of the mirror facets are defined as D and L, respectively, an amount of deformation (displacement) in each mirror facet caused by the centrifugal force at the time of high-speed rotation can be limited to about 100 nm since a value of D/L is set in a range of from 0.37 to 0.41. Therefore, the mirror facet is able to deflect and reflect a laser beam with high accuracy. Accordingly, when the polygon mirror drive motor that has the above-stated polygon mirror mounted thereon is applied to a laser beam printer, a photocopier, or the like, the image quality of the picture produced on paper or photoreceptor by the printer or the like can be greatly improved.

By the way, the distance L between the two mirror facets opposing each other corresponds to an edge length of the square surfaces unless a corner is planed off, the corner being formed where the mirror facets meet. The distance L may be referred to as an edge length of the square surfaces or simply an edge length, when appropriate, hereafter.

DESCRIPTION OF THE PREFERRED EMBODIMENTS

Referring to FIGS. 3 to 9, a preferred embodiment of the polygon mirror drive motor according to the present invention will be described in detail hereafter.

Figure 3:
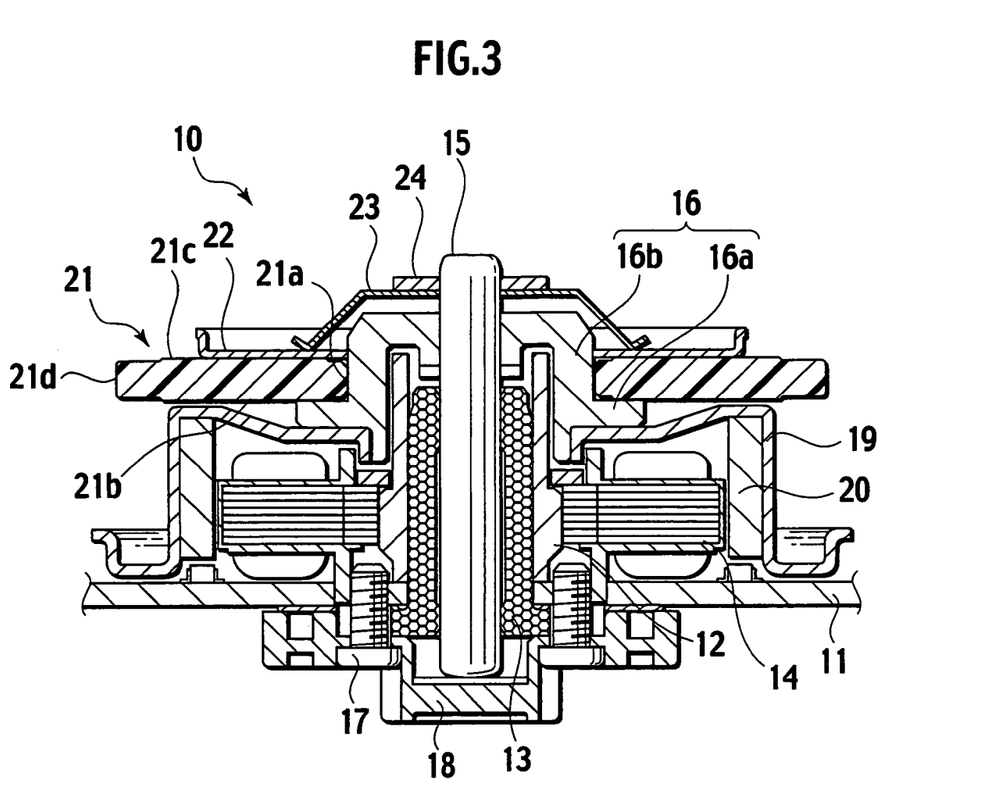
FIG. 3 is a sectional view illustrating a polygon mirror drive motor according to the present invention.

As shown in FIG. 3, a polygon mirror drive motor 10 according to the present invention is comprised of a stator portion and a rotor portion.

In the stator portion, a bearing holder 12 is attached orthogonally on a stator substrate 11 as a base. In addition, an oil-free bearing 13 is fitted into the bearing holder 12, and a plurality of drive coils 14 are arranged at a perimeter of the bearing holder 12.

In the rotor portion, a rotation shaft 15 is rotatably inserted into the oil-free bearing 13 fitted in the bearing holder 12. A flange member 16 is pushed into the upper end of the rotation shaft 15 and the lower end of the rotation shaft 15 was supported by a holder member 18 that is attached on the back surface of the stator substrate 11 with the aid of a screw 17.

The flange member 16, which is pushed into the upper end of the rotation shaft 15, has a flange portion 16a having a large diameter and a rotation drive shaft portion 16b. This portion 16b is formed protrusively upward from the flange portion 16a and has a smaller diameter. The flange portion 16a and the rotation drive shaft portion 16b are integrally formed into the flange member 16.

On the lower face of the flange portion 16a of the flange member 16, a rotor yoke 19 is attached integrally and coaxially with the flange member 16. Along the inner wall of the rotor yoke 19 is secured a ring-shaped drive magnet 20. The drive magnet 20 opposes the plurality of drive coils 14 attached on the stator substrate 11, leaving a slight clearance therebetween.

In addition, on the flange member 16 is mounted a polygon mirror 21 of hexahedron shape which constitutes an essential portion of the present invention.

Figure 4:
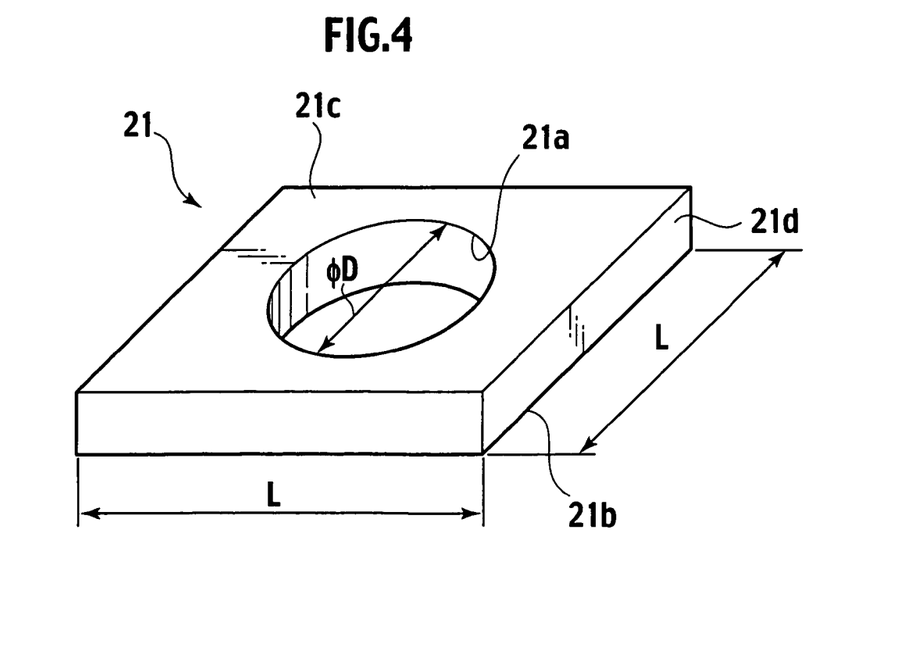
FIG. 4 is a perspective view of the polygon mirror illustrated in FIG. 3.

As shown in FIG. 4, the polygon mirror 21 is configured into a hexahedron shape with two square faces 21b, 21c and four mirror facets 21c. The square faces 21b, 21c have a circular center hole 21a that has a center point thereof on a rotation axis of the rotor. Into the center hole 21a is inserted the rotation drive shaft 16b of the above-stated flange member 16. Also, the square faces 21b, 21 care arranged parallelly with each other and intersect with the rotation drive shaft portion 16b. The four mirror facets 21c are each arranged parallelly with the rotation drive shaft portion 16b.

Namely, in the center portion of the polygon mirror 21, the center hole 21a for the rotation drive shaft portion 16b of the flange member 16 to be inserted through is formed so as to pierce through the polygon mirror 21 from the lower face 21b to the upper face 21c. Also, the four mirror facets 21d on which a metal reflection film made of such as but not limited to Aluminum is formed so as to surround the edge of the two square faces 21b, 21c to become the four sides of the polygon mirror 21.

Although this embodiment describes an instance in which the rotation drive shaft portion 16b of the flange member 16 is inserted into the center hole 21a of the polygon mirror 21, the rotation drive shaft portion 16b of the flange 16 is not necessarily inserted into the center hole 21a when the rotation shaft 15 of the rotor is directly inserted through the center hole 21a. Alternatively, the rotation drive shaft portion 16b may not always be provided when the rotation shaft 15 is inserted through the center hole 21a. In another way, the rotation drive shaft portion 16b may be provided on the stator. However, since the diameter of the center hole 21a of the polygon mirror 21 needs to be determined in accordance with a condition described hereinafter in this embodiment, the diameter of the rotation shaft 15 or the rotation drive shaft portion 16b has to coincide with the diameter of the center hole 21a of the polygon mirror 21.

When the polygon mirror 21 is mounted on the flange member 16, the rotation drive shaft portion 16b of the flange member 16 is inserted without play into the center hole 21a of the polygon mirror 21 until the lower square face 21b of the polygon mirror 21 abuts the flange portion 16a of the flange member 16. At this time, the rotation drive shaft portion 16b is concentrically aligned with the center hole 21a. In addition, a rotation axis of the rotation drive shaft portion 16b and the center point of the center hole 21a are in line with the rotation axis of the rotor. Then, a cup-shaped pressing member 22 is mounted on the upper square face 21c of the polygon mirror 21. A plate spring 23 is provided on the pressing member 22 and a stopper ring 24 is engaged on the upper end portion of the rotation shaft 15. With the aid of the stopper ring 24, the plate spring 23 is capable of pressing the polygon mirror 21 down on the flange member 16 while the pressing member 22 is interposed between the plate spring 23 and the polygon mirror 21. Therefore, the polygon mirror 21 and the flange member 16 can rotate in concert by the rotation of the rotation shaft 15 of the rotor portion.

In the polygon mirror drive motor 10 assembled as mentioned above, when drive current flows through the plurality of drive coils 14 attached on the stator substrate 11, rotation driving force arises with the plurality of drive coils 14 and the drive magnet 20 of ring shape attached along the inner circumference surface of the rotor yoke 19. As a result, the polygon mirror 21 mounted on the flange member 16 can rotate at high speed around the rotation shaft 15 and then a laser beam irradiated from a laser light source (not shown) is deflected and scanned by being reflected by the four mirror facets 21d formed on each side of the polygon mirror 21.

As shown in FIG. 4, in the polygon mirror 21 formed into a hexahedron, when the center hole 21a (the circular hole) into which the rotation drive shaft portion 16b of the flange member 16 (FIG. 3) is inserted has a diameter of D and the square faces 21b, 21c of the polygon mirror 21 have an edge length of L, the square faces being orthogonal to the rotation drive shaft portion 16b of the flange member 16 (FIG. 3) and parallel with each other, a deformation in each mirror facet 21d produced by the centrifugal force at the time of high-speed rotation of the polygon mirror 21 along with the flange member 16 by the polygon mirror drive motor 10 is analyzed by the finite element method. As a result, it should be noted that the amount of deformation of each mirror facet 21d changes with a value of D/L.

By the way, the above-mentioned finite element method is a numerical analyzing method for solving mathematically an equation that is obtained by modeling an object as a group of finite elements having finite flexibility. While an explanation about the principle of the finite element method is omitted, simulation results by the finite element method will be described hereinafter.

When rotating the square polygon mirror 21 at high speed, it is known from Japanese Patent Application Laid-open Publication H09-43529 mentioned above with reference to FIG. 1 that each mirror facet 21d which forms each side surrounding the two square faces 21b, 21c is deformed by the centrifugal force that takes place in the polygon mirror 21, and therefore a flatness of each mirror facet 21d will change.

Here, if an amount of change in the flatness of each mirror facet 21d of the polygon mirror 21 becomes larger when the polygon mirror 21 rotates at high speed, an adverse effect is exerted on the scanning of a laser beam by each mirror facet 21d. As far as the flatness of each mirror facet 21d of the polygon mirror 21 is concerned, it is known that the flatness needs to be ¼ or less of a laser beam wavelength. Specifically, when a red semiconductor laser easily available is used as a laser light source (not shown), since the wavelength of this red semiconductor laser is about 632 nm, the permissible amount of the deformation of each mirror facet 21d is about 158 nm or less, which corresponds to a ¼ or less of this wavelength. In this case, since the flatness should include a flatness of each mirror facet 21d when the polygon mirror 21 stands still, which is generally about 60 nm that may occur during fabrication, a permissible deformation caused by the centrifugal force has to be limited to about 100 nm.

According to the present invention, since the polygon mirror 21 is formed into a hexahedron, four mirror facets 21d which surround two parallel faces 21b, 21c and thereby form each side of the polygon mirror 21 is formed with sufficient accuracy. Moreover, the polygon mirror 21 can reduce its own weight when it is made of a synthetic resin material, such as but not limited to polycarbonate.

Using the finite element method, there has been simulated a deformation of each mirror facet 21d caused by the centrifugal force at the time of high-speed rotation, in case where the rotation drive shaft portion 16b of the flange member 16 is inserted without play into the center hole 21a of the polygon mirror 21, the polygon mirror 21 is pressed against the flange portion 16b of the flange member 16 with a bias force exerted by the plate spring 23, and therefore the polygon mirror 21 rotates at high speed.

Figure 5A:
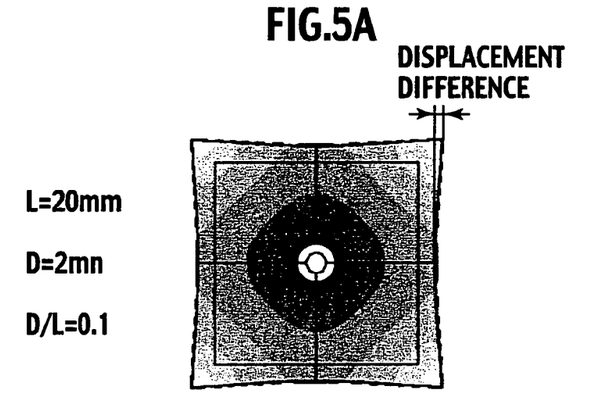
FIGS. 5A to 5C illustrate simulation results in case of a value D/L of 0.1, 0.39, and 0.6, respectively, the results being obtained by the finite element method about deformation produced in each mirror facet by the centrifugal force at the time of high-speed rotation when an edge length L of two square faces is set as 20 mm while the diameter of a center hole is defined as D mm in a square polygon mirror.
Figure 5B:
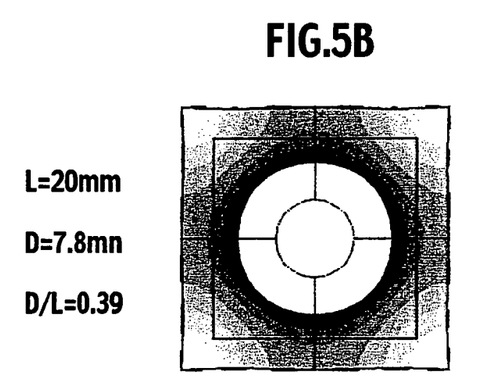
Figure 5C:
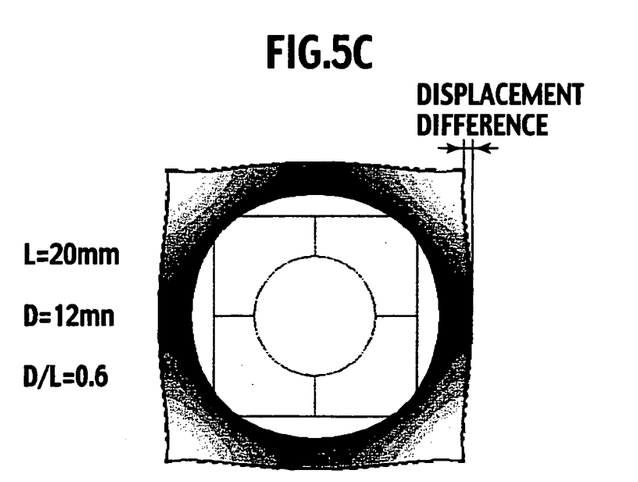

Specifically, FIGS. 5A to 5C illustrate a simulation result about a deformation produced in each mirror facet 21 by the centrifugal force at the time of high-speed rotation for various values of D/L wherein L of 20 mm is an edge length of the two square faces that are parallel with each other and orthogonal to the rotation drive shaft portion of the flange portion mentioned above and D mm is the diameter of the center hole.

In the simulation, the rotation speed of the polygon mirror 21 is set as 30,000 rotations per minute (RPM). In addition, the simulation has been carried out, assuming that the polygon mirror 21 is manufactured of polycarbonate, and therefore Young's modulus of polycarbonate is 8,000 MPa, and a density of polycarbonate is 1.43 g/cm$^3$.

Firstly, as shown in FIG. 5A, when the edge length L of the two square faces 21b, 21c of the polygon mirror 21 is set as 20 mm and the center hole has a relatively small diameter D of 2 mm, the value of D/L results in 0.1. as a result. In this case, since there is little deformation of the central portion of each mirror facet 21d, the polygon mirror 21 deforms so that the four corners thereof stretches outwardly. Consequently, each mirror facet 21d deforms into a concave on the whole. This is because the length on the diagonal line from the center hole 21a of the polygon mirror 21 to each corner is longer than the length (=L/2) from the center hole 21a to the central portion of each mirror facet 21d and thereby a larger outward force is exerted on the four corners.

In the following description, a difference between the maximum value and the minimum value of the deformation that takes place in one mirror facet is referred to as "displacement difference". When this term is used, the displacement difference is about 115 nm in case of FIG. 5A, which suggests that the flatness of each mirror facet be worse.

Next, as shown in FIG. 5C, when the edge length L of the two square faces 21b, 21c of the polygon mirror 21 is set as 20 mm and the center hole has a relatively large diameter D of 12 mm on contrary to the above, the value of D/L results in 0.6. In this case, the polygon mirror 21 deforms so that the central portion of each mirror facet bulges outward into the shape of a convex. This is because the diameter of the center hole is provided so as to be relatively large and a portion between the circumferential edge of the center hole and the center portion of the mirror facet 21d becomes thin; and, thereby the portion becomes deformable to the centrifugal force. As a result, the displacement difference is now 161 nm in case of FIG. 5C, suggesting that the flatness of each mirror facet become worse.

As apparent from the above description, there are two cases in terms of a deformation taking place in the polygon mirror 21. In other words, the polygon mirror 21 deforms into a shape in which the four corners thereof may sharpen as shown in FIG. 5A or a shape in which each mirror facet deforms concavely as shown in FIG. 5C. Then, there is expected an optimal condition between the two cases wherein an amount of deformation (displacement difference) of each mirror facet of the polygon mirror 21 becomes the minimum. In this embodiment, the optimal condition that provides the minimum amount of deformation (displacement difference) of each mirror facet 21d of the polygon mirror 21 at the time of high-speed rotation has been presented as shown in FIG. 5B.

Namely, as shown in FIG. 5B, when the edge length L of the two square face 21b, 21c of the polygon mirror 21 is set as 20 mm and the diameter D of the center hole 21a is set as 7.8 mm, the value of D/L becomes 0.39 accordingly. In this case, each mirror facet 21d of the polygon mirror 21 scarcely deforms and the displacement difference is only 0.97 nm as shown in FIG. 5B, which suggests that the displacement difference is much smaller in this case than in the above two cases shown in FIGS. 5A and 5C and the flatness of each mirror facet 21d be greatly improved as compared with the above two cases.

Figure 6A:
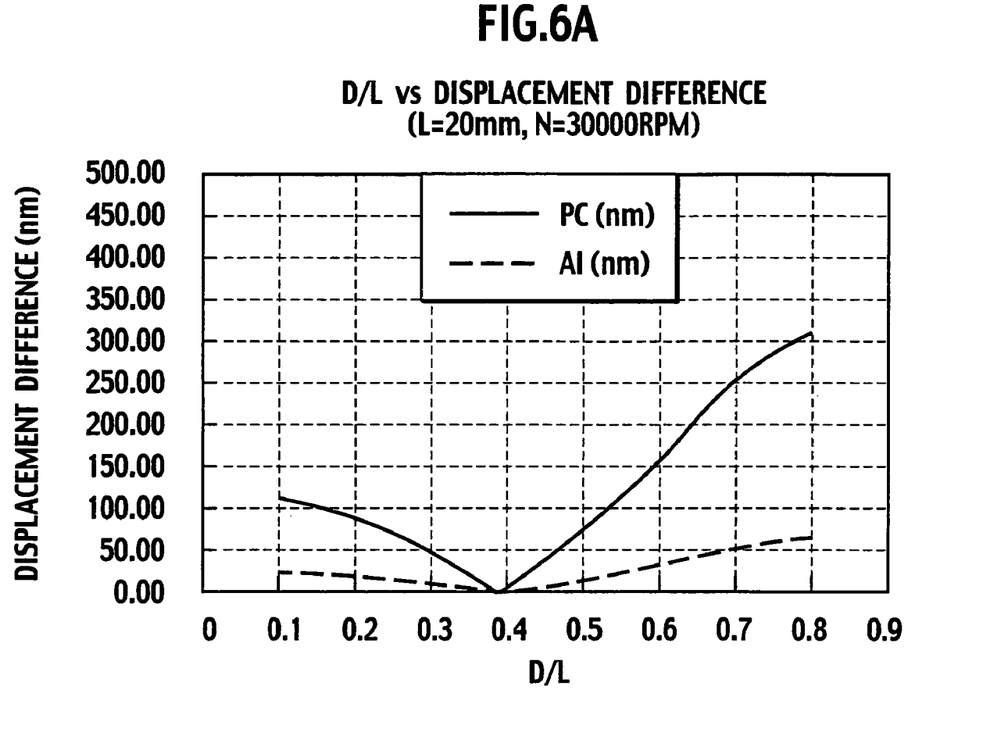
FIGS. 6A and 6B illustrate a displacement difference caused in each mirror facet by the centrifugal force at the time of high speed rotation of a polygon mirror formed into a shape of a hexahedron when an edge length L of two square faces of the polygon mirror and the diameter of the center hole of the square face are set as 20 mm and D mm, respectively, and a D/L value as a variable is varied from 0.1 to 0.8.
Figure 6B:
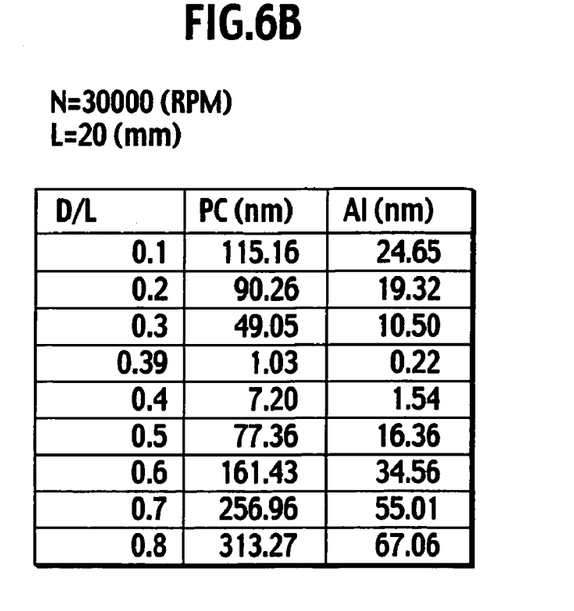

Next, another simulation result is shown in a full-line in FIG. 6A. This simulation has been carried out under assumptions that the polygon mirror 21 is produced of the polycarbonate (PC) which has the same characteristic of that used for the polygon mirror shown in FIGS. 5A to 5C; the edge length of the square faces 21b, 21c is set as 20 mm; and the center hole diameter is D mm as shown in FIGS. 6A and 6B. By the way, the rotation speed is assumed to be 3,000 rpm in this case.

Moreover, for reference, yet another simulation has been carried out under assumptions that the polygon mirror is produced of Aluminum, that is, the Young's modulus and the density of Aluminum are 70,300 MPa and 2.69 g/cm$^3$, respectively, and other parameters are the same as the polygon mirror produced of PC described above. This result is shown in a dotted line in FIG. 6A.

As shown in FIGS. 6A and 6B, the minimum displacement difference of each mirror facet 21d of the polygon mirror is obtained at the D/L value of 0.39 in both cases where the polygon mirror is produced of PC and Aluminum, respectively. Also, as apparent from FIGS. 6A and 6B, as the D/L value decreases from 0.39 to 0.1, the displacement difference tends to increase in both cases and at the same value of D/L a larger displacement difference is obtained in case of the polygon mirror produced of PC. Furthermore, it is found from FIGS. 6A and 6B that as the D/L value increases from 0.39 to 0.8, the displacement difference tends to increase at a higher rate.

Next, another simulation result on the displacement difference that takes place in the mirror facet 21d at the time of high speed rotation will be described below. In the simulation, the edge length of the two square faces 21b, 21c that are parallel with the rotation drive shaft portion of the flange is set as 40 mm and other parameters are the same as the simulation described in reference to FIGS. 5A to 5C. Again, the simulation is carried out using the finite element method. Here, the results are shown in FIGS. 7A to 7C at a different scale size from those in FIGS. 5A to 5C.

Figure 7A:
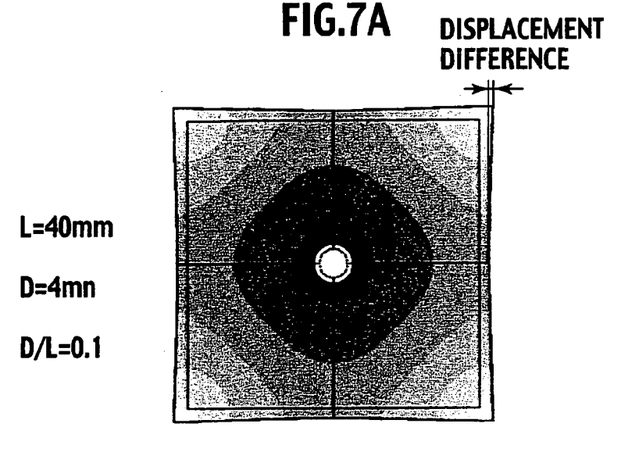
FIGS. 7A to 7C illustrate simulation results in case of a value D/L of 0.1, 0.39, and 0.6, respectively, the results being obtained by the finite element method about deformation produced in each mirror facet by the centrifugal force at the time of high-speed rotation when an edge length L of two square faces is set as 40 mm while the diameter of a center hole is defined as D mm in a square polygon mirror.

As shown in FIG. 7A in which L and D are set as 40 mm and 4 mm, respectively, resulting in the D/L value of 0.1, the polygon mirror deforms so that the four corners thereof stretches outwardly as is the case with FIG. 5A because the center hole is formed so as to have a relatively small diameter. As a result, each mirror facet of the polygon mirror deforms into a concave on the whole, so that the displacement difference is about 886 nm exhibiting a relatively degraded flatness.

Figure 7B:
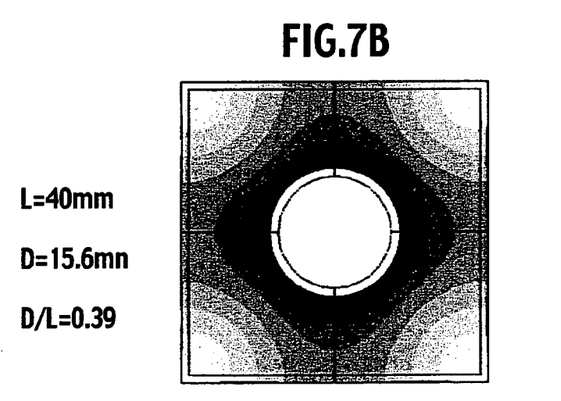

Next, in FIG. 7B in which L and D are set as 40 mm and 15.6 mm, respectively, resulting in the D/L value of 0.39, each mirror facet of the polygon mirror scarcely deforms and the displacement difference of 4.9 nm is obtained, exhibiting an apparently improved flatness, as is the case with FIG. 5B.

Figure 7C:
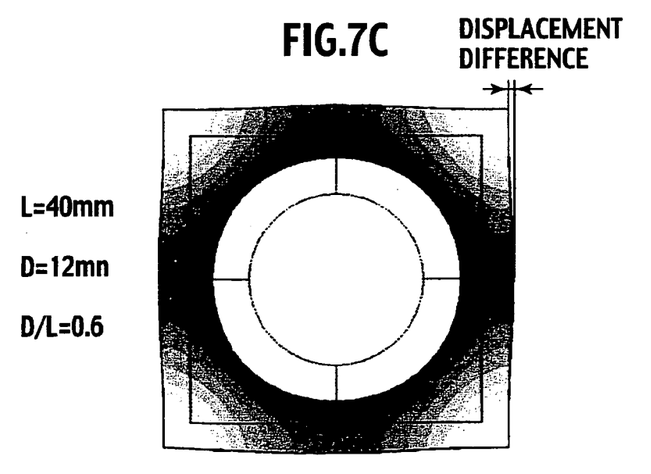

On the other hand, in FIG. 7C in which L and D are set as 40 mm and 24 mm, respectively, resulting in the D/L value of 0.6, the center portion of each mirror facet deforms so as to bulge out into a convex shape and the displacement difference of 1,239 nm is obtained, exhibiting again a relatively degraded flatness, as is the case with FIG. 5C.

Next, a different simulation has been carried out assuming that the polygon mirror is produced of the polycarbonate (PC) which has the same characteristic of that used for the polygon mirror shown in FIGS. 7A to 7C; the edge length of the square faces 21b, 21c is set as 40 mm; and the center hole diameter is D mm. In addition, the simulation has been carried out by changing a D/L value from 0.1 to 0.8 with a small increment. The result is shown in a full-line in FIG. 8.A. By the way, yet another simulation result is shown in a dotted line in FIG. 8A assuming that the polygon mirror is produced into the same configuration as above except that the polygon mirror is produced of Aluminum.

Figure 8A:
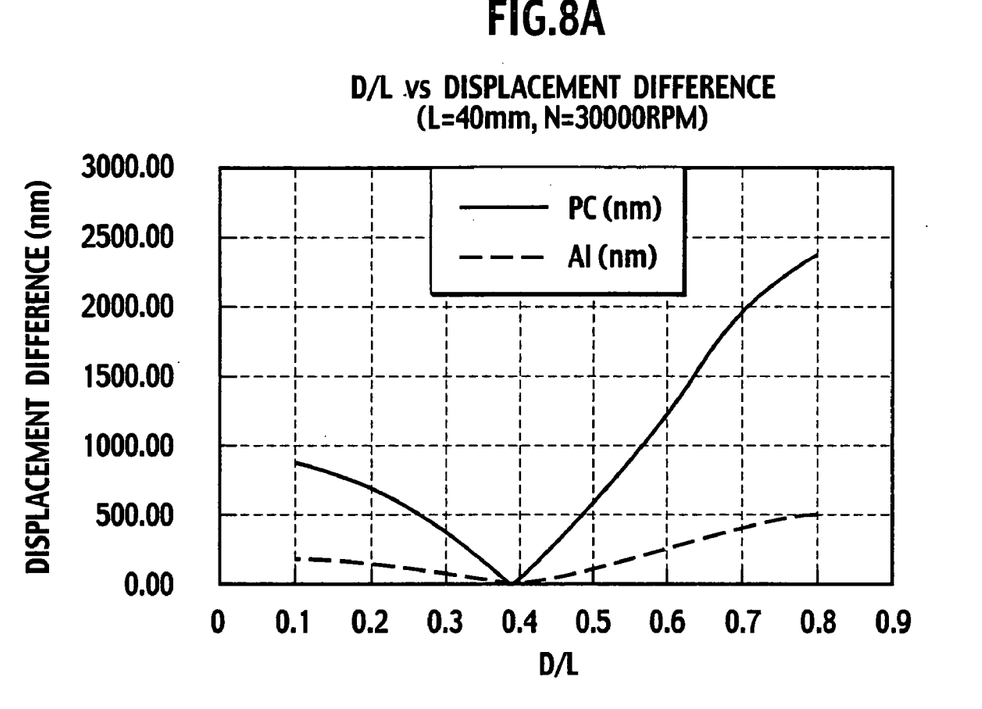
FIGS. 8A and 8B illustrate a displacement difference caused in each mirror facet by the centrifugal force at the time of high speed rotation of a polygon mirror formed into a shape of a hexahedron when an edge length L of two square faces of the polygon mirror and the diameter of the center hole of the square face are set as 40 mm and D mm, respectively, and a D/L value as a variable is varied from 0.1 to 0.8.
Figure 8B:
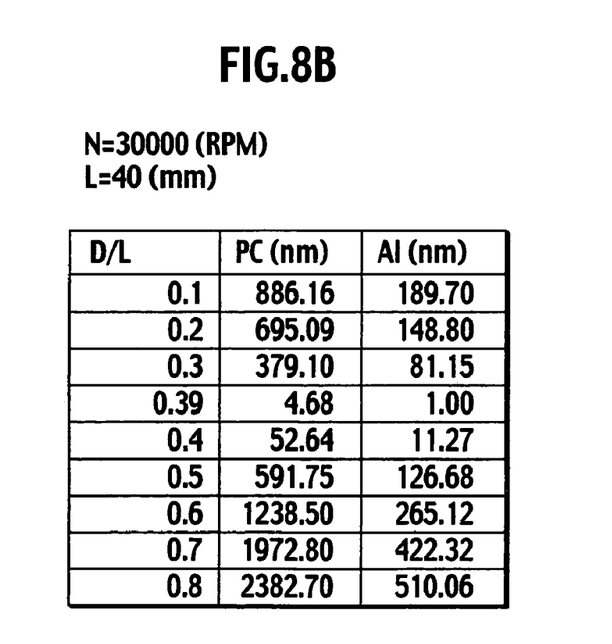

As apparent from FIGS. 8A and 8B, the polygon mirror 21, the configuration of which is assumed as above, has substantially the same tendency as described in reference to FIGS. 6A and 6B. Namely, even when the edge length L of the two square faces is set as 40 mm, the displacement difference of each mirror of the polygon mirror 21 becomes minimum at the D/L value of 0.39 in both cases where the polygon mirror 21 is produced of PC and Aluminum, respectively, as is the case with the polygon mirror described in reference to FIGS. 6A and 6B. In addition, it has been found that displacement difference of each mirror facet 21d tends to be larger in FIGS. 8A and 8B than in FIGS. 6A and 6B, compared for a same value of D/L.

Figure 9:
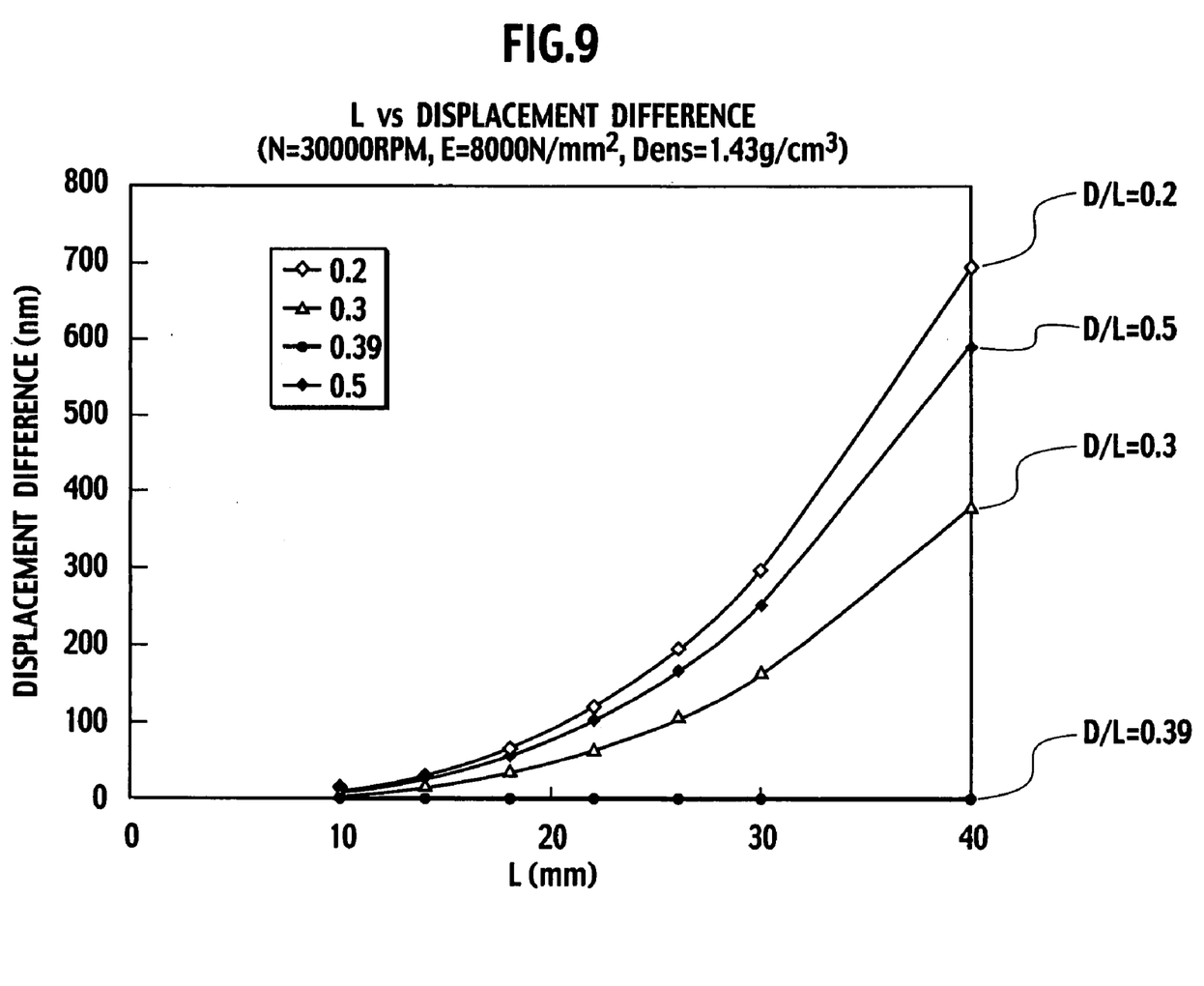
FIG. 9 illustrates a simulation result by the finite element method about the deformation produced in each mirror facet by the centrifugal force at the time of high-speed rotation, in which an edge length L of the square face of the polygon mirror is varied as a variable.

Furthermore, as shown in FIG. 9, a different simulation by the finite element method has been carried out using as a variable an edge length L of the two square faces ranging from 10 mm to 40 mm under assumptions that polygon mirrors formed into a hexahedron using polycarbonate have a D/L value of 0.2, 0.3, 0.39, and 0.5, respectively. By the way, an edge length L of 14 mm, 20 mm, and 40 mm of the two square faces is generally adopted in the industry.

As apparent from FIG. 9, irrespective of the edge length L of the two square faces of the polygon mirror, the minimum displacement difference in each mirror facet 21d is realized at the D/L value of 0.39.

As stated above, when a polygon mirror formed into a hexahedron having two square faces using polycarbonate rotates at high speed and reflects a laser beam having a wavelength of 632 nm or so from a red semiconductor laser (not shown) in order to deflect and scan the beam by each mirror facet thereof, the flatness of the mirror facet needs to be 158 nm or less, which corresponds to one-fourth of the wavelength. In addition, taking into account of flatness at the time of stationary, the flatness (displacement difference) caused by the centrifugal force at the time of high speed rotation has to be limited to about 100 nm.

Next, a D/L value that satisfies an amount of deformation (displacement difference) caused by centrifugal force of about 100 nm or less is estimated, under conditions that the edge length of the two square faces constituting the polygon mirror formed into a hexahedron using polycarbonate is assumed to be 40 mm, which is the largest length among those generally adopted in this industry. Namely, when the D/L value is 0.37, which lies between 0.3 and 0.39 (refer to FIG. 8B), the displacement difference Δ (DELTA) is obtained as follows:

$$\Delta(DELTA)=\{2\times(379.10-4.68)/10+4.68\}=87.9$$

When the D/L value is 0.41, which lies between 0.4 and 0.5, (refer to FIG. 8B), the displacement difference Δ (DELTA) is obtained as follows:

$$\Delta(DELTA)=\{(591.75-52.64)/10+52.64\}=106.5$$

Therefore, when the D/L value is in a range from 0.37 to 0.41, the above-stated permissive displacement difference of about 100 nm is satisfied.

In addition, a D/L value that satisfies an amount of deformation (displacement difference) caused by the centrifugal force of about 100 nm or less is again estimated, under conditions that the edge length of the two square faces 21b, 21c constituting the polygon mirror formed into a hexahedron using polycarbonate is assumed to be 20 mm, which is a medium size among those generally adopted in this industry. Here, when the D/L value is 0.16, which lies between 0.1 and 0.2 (refer to FIG. 6B), the displacement difference Δ (DELTA) is obtained as follows:

$$\Delta(DELTA)=\{4\times(115.16-90.26)/10+90.26\}=100.2$$

When the D/L value is 0.52, which lies between 0.5 and 0.6, (refer to FIG. 6B), the displacement difference Δ (DELTA) is obtained as follows:

$$\Delta(DELTA)=\{2\times(161.43\times77.36)/10+77.36\}=94.1$$

Therefore, when the D/L value is in a range from 0.16 to 0.52, the above-stated permissive displacement difference of about 100 nm is satisfied.

As a result, it has been concluded that irrespective of the edge length L of the two square faces of the polygon mirror formed into a hexahedron using polycarbonate, the D/L value has to be preferably in a range from 0.37 to 0.41 in order to realize an amount of deformation (displacement difference) of about 100 nm caused by the centrifugal force at the time of high speed rotation.

By the way, the above range of the D/L value (0.37 to 0.42) is also preferable even when a polygon mirror is produced of Aluminum that has higher rigidity than polycarbonate, because the displacement difference of each mirror facet of the polygon mirror is smaller in the Aluminum-made polygon mirror than in the PC-made polygon mirror.

In conclusion, when the D/L value is set to be in a range from 0.37 to 0.41, favorable deflection and scanning of a laser beam by each mirror facet is realized since an amount of deformation (displacement difference) caused by the centrifugal force at the time of high speed rotation is limited to about 100 nm. Therefore, when a polygon mirror drive motor having such a polygon mirror mounted therein is utilized in a laser beam printer or a photocopier, a high-quality images can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polygon mirror drive motor comprising:
   a stator, and
   a rotor having a hexahedron-shaped polygon mirror,
   wherein said polygon mirror has a circular hole having a center point thereof on a rotation axis of said rotor, two square faces that are parallel with each other and orthogonal to said rotation axis, and four mirror facets that are parallel with said rotation axis, and
   wherein a value of D/L is in a range of from 0.37 to 0.41 where D is a diameter of said circular hole and L is a distance between two of said four mirror facets, the two mirror facets opposing each other.

2. A polygon mirror drive motor according to claim 1, further comprising a rotation drive shaft that is provided on said rotation axis and inserted through said circular hole.

* * * * *